United States Patent
Anand

(10) Patent No.: US 7,742,752 B2
(45) Date of Patent: Jun. 22, 2010

(54) PASSIVE FILTER SELECTIVITY WITH PRECISE RESOLUTION FOR INTEGRATED CIRCUIT RADIOS

(75) Inventor: Seema B. Anand, Rancho Palos Verdes, CA (US)

(73) Assignee: Broadcom Corporation, Irvine, CA (US)

( * ) Notice: Subject to any disclaimer, the term of this patent is extended or adjusted under 35 U.S.C. 154(b) by 608 days.

(21) Appl. No.: 11/686,933

(22) Filed: Mar. 15, 2007

(65) Prior Publication Data

US 2008/0139238 A1  Jun. 12, 2008

Related U.S. Application Data

(60) Provisional application No. 60/873,235, filed on Dec. 6, 2006.

(51) Int. Cl.
  *H04B 1/28* (2006.01)
  *H04M 1/00* (2006.01)
(52) U.S. Cl. .................. 455/333; 455/67.11; 455/550.1
(58) Field of Classification Search .............. 455/550.1, 455/333, 226.1, 67.11, 334, 338, 340, 73
See application file for complete search history.

(56) References Cited

U.S. PATENT DOCUMENTS

| | | | | |
|---|---|---|---|---|
| 3,972,626 A * | 8/1976 | Laskowsi | ..................... | 356/226 |
| 5,426,386 A * | 6/1995 | Matthews et al. | ............. | 327/63 |
| 6,559,714 B2 * | 5/2003 | Park et al. | ................... | 327/553 |
| 6,791,809 B2 * | 9/2004 | Pannwitz | ...................... | 361/90 |
| 7,339,357 B2 * | 3/2008 | Lopata | ........................ | 323/282 |
| 2008/0008337 A1 * | 1/2008 | Liu | ............................. | 381/120 |

* cited by examiner

*Primary Examiner*—Sonny Trinh
(74) *Attorney, Agent, or Firm*—Garlick Harrison & Markison; James A. Harrison

(57) ABSTRACT

An integrated circuit radio transceiver and method therefor includes a parallel resistive circuit that provides high resolution to resistive circuitry in a hardware efficient manner for use in a plurality of applications including active filters requiring a precise bandwidth, voltage sources that require a precise voltage output, and current sources that require a precise current output source. The parallel resistive circuit includes at least one base resistive device, whose resistive value may be selectable, in parallel with a plurality of selectable circuit paths, each having a plurality of series coupled resistive values formed in an approximate location of the integrated circuit to reduce process variations. The paths are selectable by logic to provide a desired operational characteristic.

31 Claims, 9 Drawing Sheets

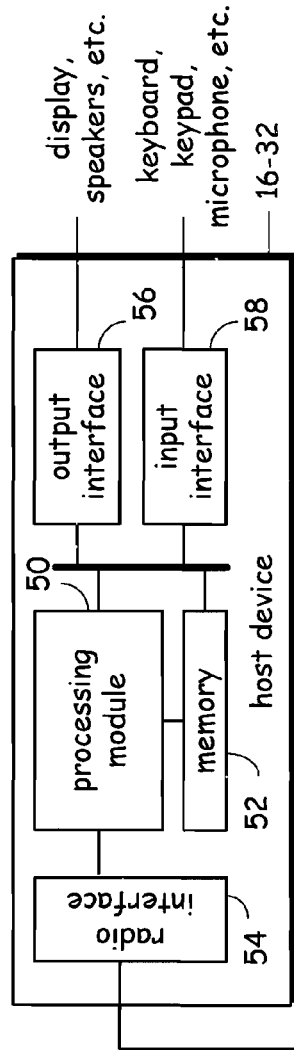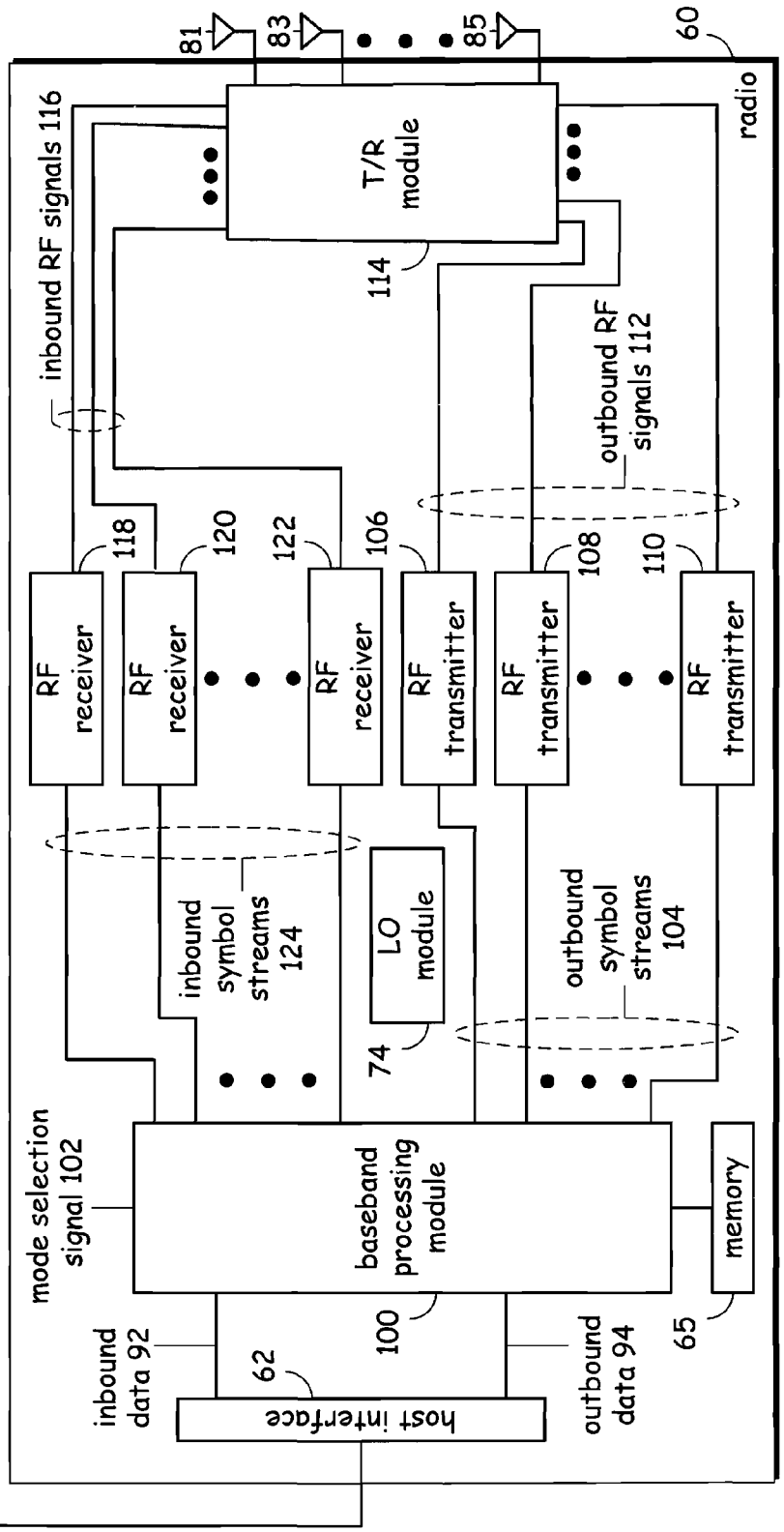
FIG. 3
MIMO transceiver

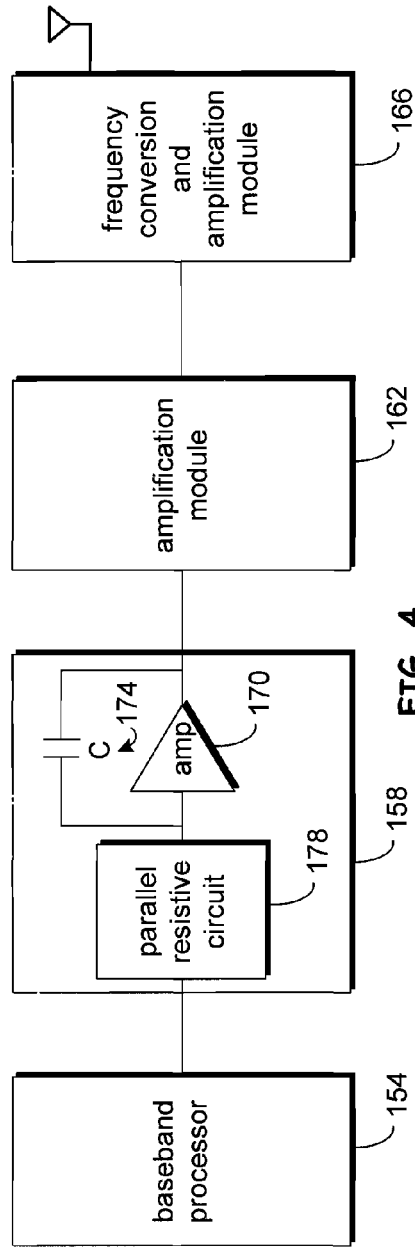
FIG. 4 integrated circuit transceiver with precise bandwidth filter 150
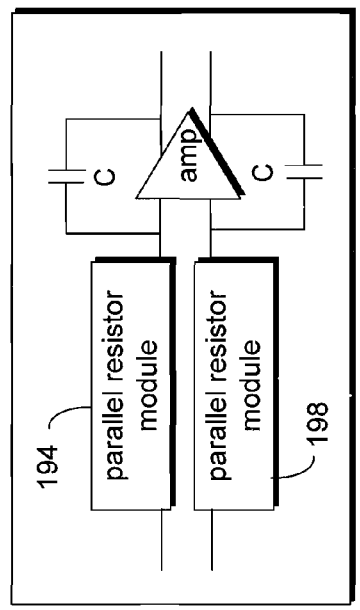
FIG. 5 integrated circuit transceiver with precise bandwidth differential filter 190

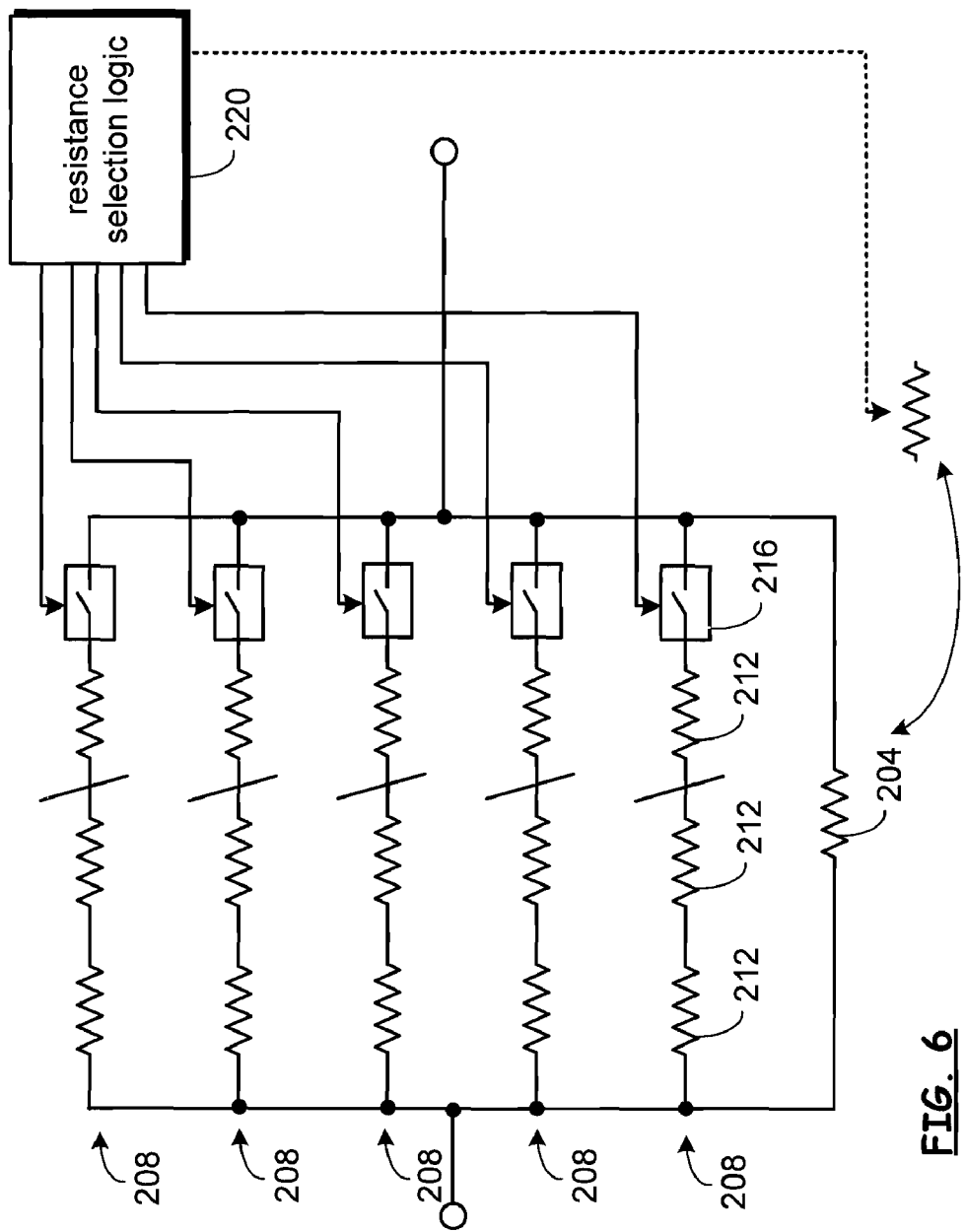
FIG. 6 parallel resistor module 200 for integrated circuit transceiver with precise bandwidth filter

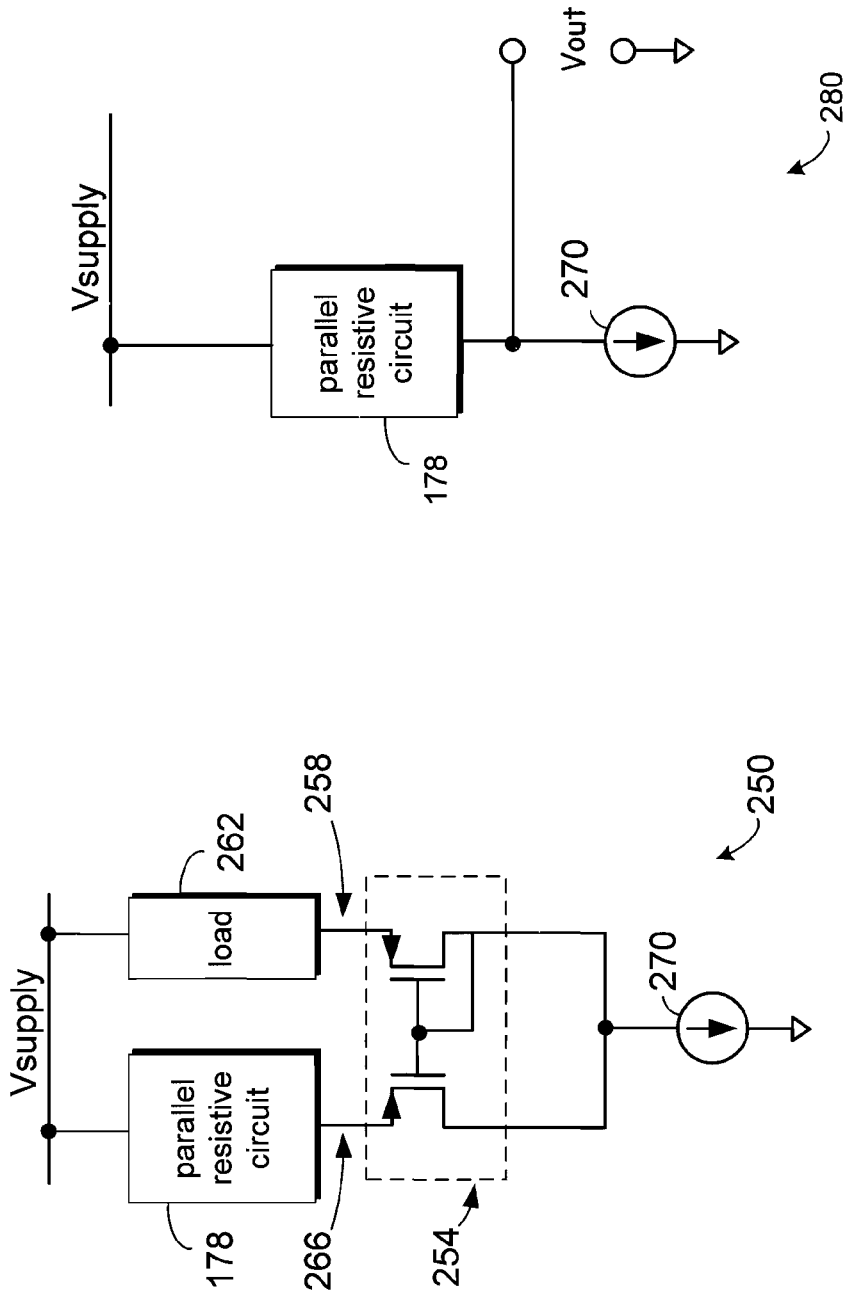

precise resolution resistive module 290 parallel resistive module 350 for integrated circuit transceiver with precise bandwidth filter

US 7,742,752 B2

PASSIVE FILTER SELECTIVITY WITH PRECISE RESOLUTION FOR INTEGRATED CIRCUIT RADIOS

CROSS REFERENCE TO RELATED APPLICATIONS

This application claims priority to U.S. Provisional Application Ser. No. 60/873,235 entitled, "Passive Filter Selectivity with Precise Resolution for Integrated Circuit Radios" filed Dec. 6, 2006, which is hereby incorporated herein by reference in its entirety for all purposes.

BACKGROUND

1. Technical Field

The present invention relates to wireless communications and, more particularly, to integrated circuit radio transceiver circuitry for providing precise signal characteristics in a variety of applications including filters, voltage and current sources.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier stage. The data modulation stage converts raw data into baseband signals in accordance with the particular wireless communication standard. The one or more intermediate frequency stages mix the baseband signals with one or more local oscillations to produce RF signals. The power amplifier stage amplifies the RF signals prior to transmission via an antenna.

Typically, the data modulation stage is implemented on a baseband processor chip, while the intermediate frequency (IF) stages and power amplifier stage are implemented on a separate radio processor chip. Historically, radio integrated circuits have been designed using bi-polar circuitry, allowing for large signal swings and linear transmitter component behavior. Therefore, many legacy baseband processors employ analog interfaces that communicate analog signals to and from the radio processor.

Within an integrated circuit radio transceiver, a precise signal response is often desirable though circuitry for providing such precise signal responses is often expensive in terms of IC real estate. Accordingly, designs often provide a response that is not as tight or precise as desired in order to reduce a circuit's footprint within the integrated circuit.

SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered with the following drawings, in which:

FIG. 3 is a schematic block diagram illustrating a wireless communication device that includes a host device and an associated radio;

FIG. 4 is a functional block diagram of an integrated circuit with an active filter according to one embodiment of the present invention;

FIG. 5 is a functional block diagram that illustrates an alternate embodiment of a precise bandwidth filter for use within a plurality of applications including radio transceivers;

FIG. 6 is a functional schematic diagram illustrating one embodiment of the invention for a very precise high resolution resistive circuit that is formed within an integrated circuit radio transceiver;

FIG. 7 is a functional block diagram of a current source with a parallel resistive circuit for providing a precise current source according to one embodiment of the invention;

FIG. 8 is a functional block diagram of a voltage source with a parallel resistive circuit for providing a precise output voltage according to one embodiment of the invention;

DETAILED DESCRIPTION OF THE DRAWINGS

Figure 1:
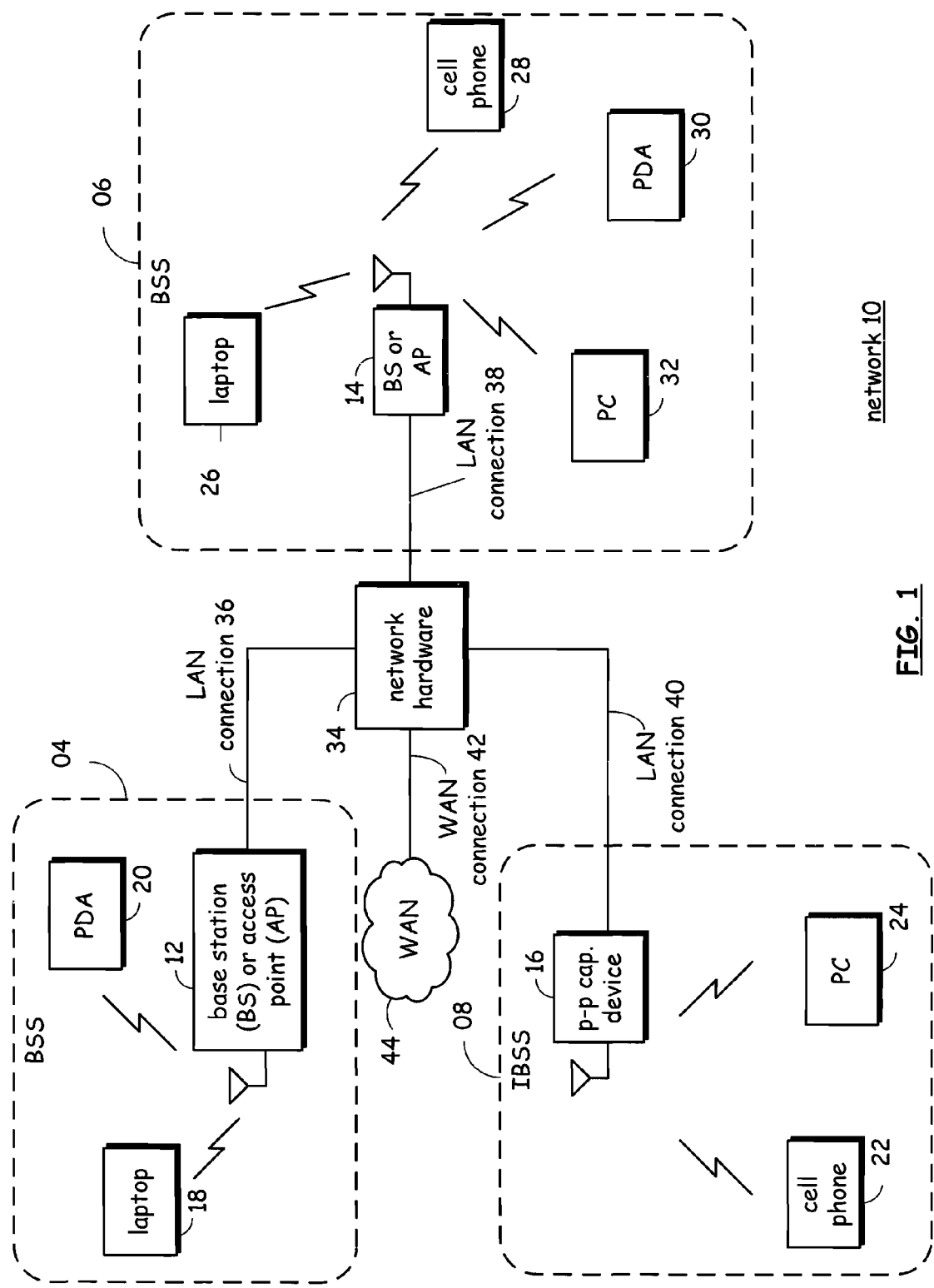
FIG. 1 is a functional block diagram illustrating a communication system that includes circuit devices and network elements and operation thereof according to one embodiment of the invention.

FIG. 1 is a functional block diagram illustrating a communication system that includes circuit devices and network elements and operation thereof according to one embodiment of the invention. More specifically, a plurality of network service areas 04, 06 and 08 are a part of a network 10. Network 10 includes a plurality of base stations or access points (APs) 12-14, a plurality of wireless communication devices 16-32 and a network hardware component 34. The wireless communication devices 16-32 may be laptop computers 18 and 26, personal digital assistants 20 and 30, personal computers 24 and 32 and/or cellular telephones 22 and 28. Wireless communication device 16 may also be a base station or access point 12-14. The details of the wireless communication devices will be described in greater detail with reference to FIGS. 2-10.

The base stations or APs 12-14 are operably coupled to the network hardware component 34 via local area network (LAN) connections 36, 38 and 40 as pare PC's 24. The network hardware component 34, which may be a router, switch, bridge, modem, system controller, etc., provides a wide area network (WAN) connection 42 for the communication system 10 to an external network element such as WAN 44. Each of the base stations or access points 12-14 has an associated antenna or antenna array to communicate with the wireless communication devices in its area. Typically, the wireless communication devices 16-32 register with the particular base station or access points 12-14 to receive services from the communication system 10. For direct connections (i.e., point-to-point or peer-to-peer communications), wireless communication devices such as wireless communication device 16 communicate directly via an allocated channel. Wireless communication device 16 may be an access point or any other device capable of engaging in IEEE 802.11 IBSS type communications in the described embodiment. In alternate embodiments, other point-to-point or peer-to-peer protocol communications may be implemented.

Typically, base stations are used for cellular telephone systems and like-type systems, while access points are used for in-home or in-building wireless networks. Regardless of the particular type of communication system, each wireless communication device includes a built-in radio and/or is coupled to a radio. Each of the integrated circuit radio transceivers within the radios comprise circuitry that are operable to provide a precise signal response wherein the circuitry is at least one of a filter, a voltage source or a current source. The approach and circuitry disclosed herein, however, may be used in conjunction with any application that includes resistive components that affect an output signal characteristic for which a precise response is required. In an IBSS service area 08, wireless communication devices 16 are operable to communicate with each other and other wireless communication devices 16-32 using IBSS peer-to-peer ad-hoc communication protocols.

Figure 2:
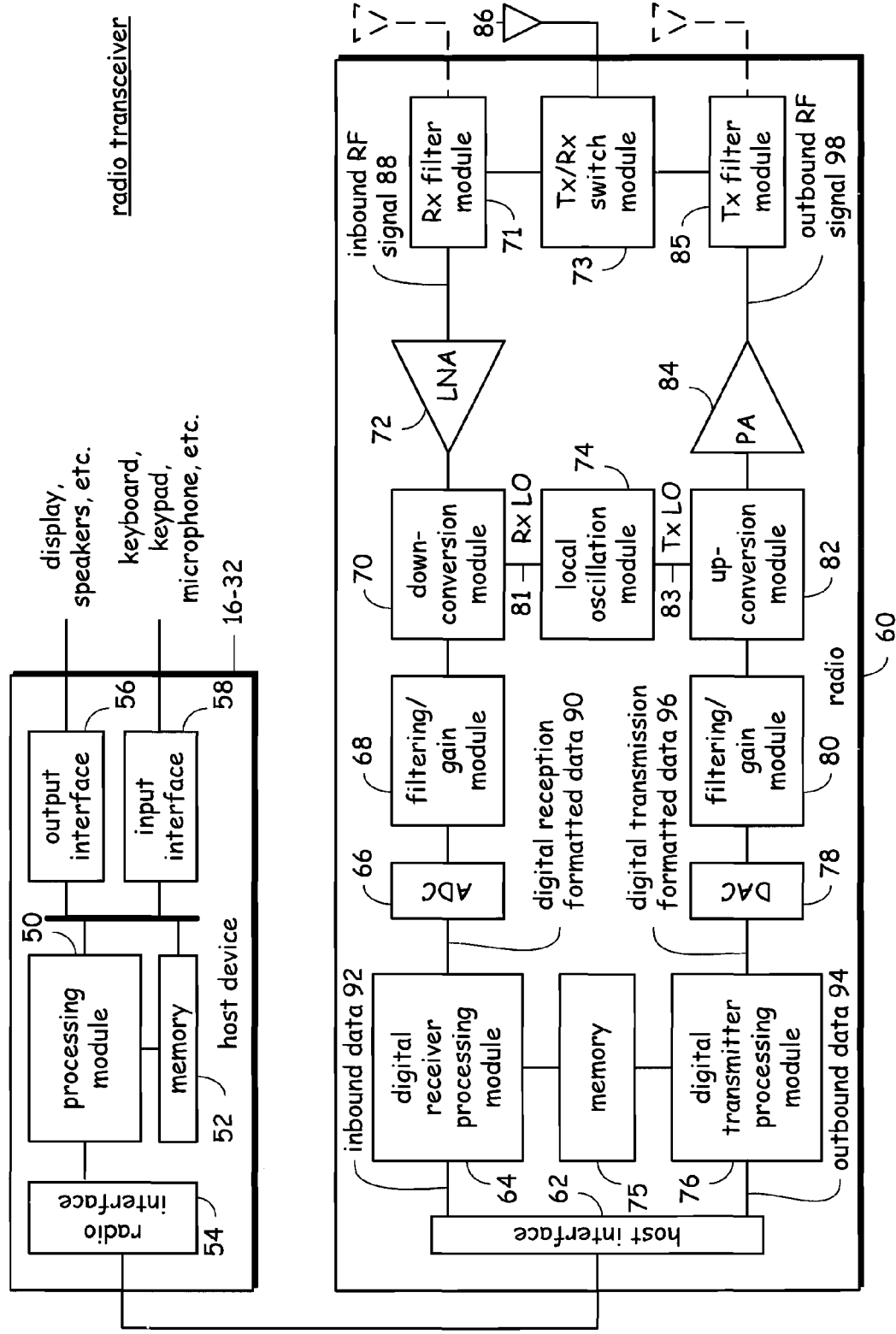
FIG. 2 is a schematic block diagram illustrating a wireless communication host device and an associated radio.

FIG. 2 is a schematic block diagram illustrating a wireless communication host device 16-32 and an associated radio 60. For cellular telephone hosts, radio 60 is a built-in component. For personal digital assistants hosts, laptop hosts, and/or personal computer hosts, the radio 60 may be built-in or an externally coupled component.

As illustrated, wireless communication host device 16-32 includes a processing module 50, a memory 52, a radio interface 54, an input interface 58 and an output interface 56. Processing module 50 and memory 52 execute the corresponding instructions that are typically done by the host device. For example, for a cellular telephone host device, processing module 50 performs the corresponding communication functions in accordance with a particular cellular telephone standard.

Radio interface 54 allows data to be received from and sent to radio 60. For data received from radio 60 (e.g., inbound data), radio interface 54 provides the data to processing module 50 for further processing and/or routing to output interface 56. Output interface 56 provides connectivity to an output device such as a display, monitor, speakers, etc., such that the received data may be displayed. Radio interface 54 also provides data from processing module 50 to radio 60. Processing module 50 may receive the outbound data from an input device such as a keyboard, keypad, microphone, etc., via input interface 58 or generate the data itself. For data received via input interface 58, processing module 50 may perform a corresponding host function on the data and/or route it to radio 60 via radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/Rx) switch module 73, a local oscillation module 74, a memory 75, a digital transmitter processing module 76, a digital-to-analog converter 78, a filtering/gain module 80, an up-conversion module 82, a power amplifier 84, a transmitter filter module 85, and an antenna 86 operatively coupled as shown. The antenna 86 is shared by the transmit and receive paths as regulated by the Tx/Rx switch module 73. The antenna implementation will depend on the particular standard to which the wireless communication device is compliant. Oscillation module 74 is formed to include at least one embodiment or aspect of the present embodiments of the invention.

Digital receiver processing module 64 and digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, and modulation. Digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions.

Memory 75 may be a single memory device or a plurality of memory devices. Such a memory device may be a read-only memory, random access memory, volatile memory, non-volatile memory, static memory, dynamic memory, flash memory, and/or any device that stores digital information. Note that when digital receiver processing module 64 and/or digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 75 stores, and digital receiver processing module 64 and/or digital transmitter processing module 76 executes, operational instructions corresponding to at least some of the functions illustrated herein.

In operation, radio 60 receives outbound data 94 from wireless communication host device 16-32 via host interface 62. Host interface 62 routes outbound data 94 to digital transmitter processing module 76, which processes outbound data 94 in accordance with a particular wireless communication standard or protocol (e.g., IEEE 802.11(a), IEEE 802.11b, Bluetooth, etc.) to produce digital transmission formatted data 96. Digital transmission formatted data 96 will be a digital baseband signal or a digital low IF signal, where the low IF typically will be in the frequency range of one hundred kilohertz to a few megahertz.

Digital-to-analog converter 78 converts digital transmission formatted data 96 from the digital domain to the analog domain. Filtering/gain module 80 filters and/or adjusts the gain of the analog baseband signal prior to providing it to up-conversion module 82. Up-conversion module 82 directly converts the analog baseband signal, or low IF signal, into an RF signal based on a transmitter local oscillation 83 provided by local oscillation module 74. Power amplifier 84 amplifies the RF signal to produce an outbound RF signal 98, which is filtered by transmitter filter module 85. The antenna 86 transmits outbound RF signal 98 to a targeted device such as a base station, an access point and/or another wireless communication device.

Radio 60 also receives an inbound RF signal 88 via antenna 86, which was transmitted by a base station, an access point, or another wireless communication device. The antenna 86 provides inbound RF signal 88 to receiver filter module 71 via Tx/Rx switch module 73, where Rx filter module 71 bandpass filters inbound RF signal 88. The Rx filter module 71 provides the filtered RF signal to low noise amplifier 72, which amplifies inbound RF signal 88 to produce an amplified inbound RF signal. Low noise amplifier 72 provides the amplified inbound RF signal to down-conversion module 70, which directly converts the amplified inbound RF signal into an inbound low IF signal or baseband signal based on a receiver local oscillation 81 provided by local oscillation module 74. Down-conversion module 70 provides the inbound low IF signal or baseband signal to filtering/gain module 68. Filtering/gain module 68 may be implemented in accordance with the teachings of the present invention to filter and/or attenuate the inbound low IF signal or the inbound baseband signal to produce a filtered inbound signal.

Analog-to-digital converter 66 converts the filtered inbound signal from the analog domain to the digital domain to produce digital reception formatted data 90. Digital receiver processing module 64 decodes, descrambles, demaps, and/or demodulates digital reception formatted data 90 to recapture inbound data 92 in accordance with the particular wireless communication standard being implemented by radio 60. Host interface 62 provides the recaptured inbound data 92 to the wireless communication host device 16-32 via radio interface 54.

As one of average skill in the art will appreciate, the wireless communication device of FIG. 2 may be implemented using one or more integrated circuits. For example, the host device may be implemented on a first integrated circuit, while digital receiver processing module 64, digital transmitter processing module 76 and memory 75 may be implemented on a second integrated circuit, and the remaining components of radio 60, less antenna 86, may be implemented on a third integrated circuit. As an alternate example, radio 60 may be implemented on a single integrated circuit. As yet another example, processing module 50 of the host device and digital receiver processing module 64 and digital transmitter processing module 76 may be a common processing device implemented on a single integrated circuit.

Memory 52 and memory 75 may be implemented on a single integrated circuit and/or on the same integrated circuit as the common processing modules of processing module 50, digital receiver processing module 64, and digital transmitter processing module 76. As will be described, it is important that accurate oscillation signals are provided to mixers and conversion modules. A source of oscillation error is noise coupled into oscillation circuitry through integrated circuitry biasing circuitry. One embodiment of the present invention reduces the noise by providing a selectable pole low pass filter in current mirror devices formed within the one or more integrated circuits.

Local oscillation module 74 includes circuitry for adjusting an output frequency of a local oscillation signal provided therefrom. Local oscillation module 74 receives a frequency correction input that it uses to adjust an output local oscillation signal to produce a frequency corrected local oscillation signal output. While local oscillation module 74, up-conversion module 82 and down-conversion module 70 are implemented to perform direct conversion between baseband and RF, it is understood that the principles herein may also be applied readily to systems that implement an intermediate frequency conversion step at a low intermediate frequency.

FIG. 3 is a schematic block diagram illustrating a wireless communication device that includes the host device 16-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 16-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, etc., such that the received data may be displayed. The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing module 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the baseband processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 100 receives the outbound data 94 and, based on a mode selection signal 102, produces one or more outbound symbol streams 104. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode selection signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode selection signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode selection signal 102 indicates 2, 3 or 4 antennas, the baseband processing module 100 will produce 2, 3 or 4 outbound symbol streams 104 from the outbound data 94.

Depending on the number of outbound symbol streams 104 produced by the baseband processing module 100, a corresponding number of the RF transmitters 106-110 will be enabled to convert the outbound symbol streams 104 into outbound RF signals 112. In general, each of the RF transmitters 106-110 includes a digital filter and upsampling module, a digital-to-analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122. The RF receiver 118-122 converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 16-32 via the host interface 62.

As one of average skill in the art will appreciate, the wireless communication device of FIG. 3 may be implemented using one or more integrated circuits. For example, the host device may be implemented on a first integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

FIG. 4 is a functional block diagram of an integrated circuit with an active filter according to one embodiment of the present invention. An integrated circuit radio transceiver 150 includes a baseband processor 154 for generating outgoing digital signals and for receiving and processing ingoing digital signals. Baseband processor 154 is operably coupled to a precise bandwidth filter 158 and is further coupled to an amplification module 162. Amplification module 162 is further coupled to frequency conversion and amplification module 166. Frequency conversion and amplification module 166 is operable to upconvert baseband and intermediate frequency signals to RF and to amplify the upconverted signals for transmission from an antenna. Similarly, frequency conversion and amplification module 166 is operable to down-convert ingoing radio frequency (RF) signals to either intermediate frequency or baseband frequency signals. Generally, blocks 158-166 are part of typical radio front end circuitry. Thus, the front-end circuitry is operable to produce outgoing RF based upon the outgoing digital signals and for producing the ingoing digital signals based upon received ingoing RF.

The precise bandwidth filter 158 includes active filtration circuitry operably disposed to provide filtration of continuous waveform signals within the front-end circuitry. The precise bandwidth filter thus includes an amplification device 170 having an input (can be differential) and an output (can be differential), at least one capacitive device 174 coupled across the input and the output, and a high resolution parallel resistive circuit 178 coupled to an input of an amplifier and to the capacitive device.

The precise bandwidth filter 158 is operable to selectively provide very high resolution changes to operation of the filtration circuitry wherein the resistive circuit comprises a plurality of selectable parallel paths each having a plurality of series coupled resistive elements. By providing an exact and adjustable resistive value, a precise bandwidth of the active filtration circuitry may be defined. Generally, the plurality of selectable paths include resistive elements formed within a proximate region of the integrated circuit with similar process variations to provide consistency and are all formed to have a specified value.

FIG. 5 is a functional block diagram that illustrates an alternate embodiment of a precise bandwidth filter 190 for use within a plurality of applications including radio transceivers. As may be seen, a differential amplifier, for example, an operational amplifier (op amp) includes differential inputs and differential outputs with two similarly sized capacitive elements wherein each is coupled across an output and an input of the op amp. Further, a first parallel resistor module 194 is operably disposed with one input and one capacitor, while a second parallel resistor module 198 is operably disposed with the other input and the other capacitor of the two inputs and two capacitors, respectively. Each of the parallel resistor modules 194 and 198 is a very precise high resolution resistive circuit similar to circuit 178 to allow precise bandwidth selection of the active filter of FIG. 5.

FIG. 6 is a functional schematic diagram illustrating one embodiment of the invention for a very precise high resolution resistive circuit that is formed within an integrated circuit radio transceiver. Generally, FIG. 6 illustrates a parallel resistor module 200 having plurality of circuit elements configured to provide very fine resolution to provide a desired and precise resistive value which, when utilized in a filter such as filters 158 and 190 of FIGS. 4 and 5, respectively, allow precise definition of a bandwidth of the filter and of a center frequency based upon passive elements (the resistive and capacitive elements). Further, based on process deviation and other factors that result in operational variations, the circuitry of FIG. 6 allows for calibration of the bandwidth and center frequency through logic to compensate for the process and operational variations.

The integrated circuit radio transceiver, according to the embodiments of the invention, thus include a base resistive element 204 disposed in parallel to a plurality of selectable parallel resistive paths. Parallel resistor module 200, which is for use within an integrated circuit transceiver with precise bandwidth filter operation in one embodiment of the invention, includes a base resistive element 204 operably disposed in parallel with a plurality of selectable resistive paths shown generally at 208. Each of the selectable resistive paths 208 includes a plurality of resistive elements 212 and a logical switch 216 to allow operatively coupled resistance selection logic 220 to selectively couple or decouple one or more of the selectable resistive paths 208.

In operation, a maximum resistance is realized when each of the selectable resistive paths 208 is decoupled by resistance selection logic 220 opening the connection with switches 216. Thus, for example, if the base resistive element 204 has a resistive value of 600 ohms, the overall resistance value goes down as the selectable resistive paths are operatively coupled by resistance selection logic 220. In one embodiment of the invention, each resistive element 212 has a value of 2 kohms. As such, each selectable resistive path 208 provides a total resistance of 6 kohms. As one of average skill in the art may readily verify, the parallel combination of base resistive element 204 and one selectable resistive path 208 provides a total resistive value Rtotal of 545 ohms. Specifically:

$$R_{total} = \frac{1}{\frac{1}{R_{base}} + \frac{n}{R_{branch}}} \tag{1}$$

Thus, Rtotal=1/(1/600+1/6000)ohms=545 ohms for one selected path 208/

For two selected resistive paths 208:

Rtotal=1/(1/600+2/6000)ohms=500 ohms

For five selected resistive paths 208:

Rtotal=1/(1/600+5/6000)ohms=400 ohms

It may be seen, therefore, that the embodiment of the invention provides a resolution of about 45 ohms for each selected parallel resistive path. If greater resolution is required, however, such resolution may be obtained by increasing the resistance of each of the parallel resistive paths. For example, if a parallel resistive path provides a total resistive value of 32 kohms (for example, provided by sixteen series coupled resistive elements wherein each provides 2 kohms of resistance), the resolution of the parallel resistor module 200 ranges from 4 to 6 ohms, approximately.

In one embodiment of the invention, each parallel resistive path is configured to provide differing total resistive values. For example, a first path 208 provides 8 kohms, a second path 208 provides 16 kohms, a third path 208 provides 32 kohms and a fourth path 208 provides 64 kohms. As such, selective coupling of the first path 208 provides a resolution of about 45 ohms. The second path 208 provides a resolution of about 23.5 ohms. The third path 208 provides a resolution of about 12 ohms and the fourth path 208 provides a resolution of about 6 ohms. Thus, logic 220 is operable to selectively couple any one of the plurality of parallel resistive paths according to a desired total resistive value with a resolution as fine as 6 ohms. Of course, if a fifth branch having a total resistive value of 128 kohms is added to the circuit, the resolution may be reduced to 3 ohms.

In general terms, the integrated circuit radio transceiver parallel resistor module includes series coupled resistive elements that have a constant specified value and are formed from proximate regions of the integrated circuit to reduce relative process variations and further wherein the base resistive element is characterized by a resistive value substantially less than the specified value of the series coupled resistive elements. In the described embodiments, the base resistive value is slightly less than one third of each individual resistive element. For example, the base resistive element is in the range of 600-625 ohms while the individual resistive elements of the parallel selectable resistive paths are approximately 2000 ohms each. Each resistive path has a total resistance that ranges from being approximately 10 times greater than the base resistive element to 200 times greater than the base resistive element in the described embodiment, though these values are exemplary only and may readily be changed according to design requirements. For example, in one alternate embodiment, the resistive value of the base resistive element is less than one half of the resistive value of any one resistive element of each of the selectable parallel paths.

The base resistive element and the resistive elements of the parallel selectable resistive paths may comprise traditional resistors or other resistive elements including resistor configured MOSFETs. In one embodiment, the base resistive element is a variable resistive element to provide a variable base resistance to further increase the operational range of the parallel resistor module. For example, the base resistive element may comprise a resistor configured MOSFET whose base resistance value is defined by biasing levels of the MOSFET. Thus, in this embodiment, resistance selection logic 220 provides a bias level to resistive element 204 to set and approximate base resistance value. Thereafter, resistance selection logic 220 is operable to adjust the bias of the MOSFET configured as base resistive element 204 and also the coupling of the parallel resistive paths to provide a desired bandwidth and center frequency for the active filter of the radio transceiver. Thus, integrated circuit radio transceiver includes logic operable to set and adjust a resistive value of the base resistive device and for iteratively selecting the selectable parallel paths to adjust the total resistance of the high resolution resistive circuit by a desired value. In an embodiment that includes a 6 Ohm resolution and a base resistive element having a resistance that is approximately equal to 600 ohms, the resolution is less than two percent and, more specifically, is approximately equal to or less than one percent. In an alternate embodiment, a plurality of selectable base resistive elements may be selectively disposed into connectivity to vary the base resistive value. For example, five base resistors may be selectively coupled to substantially vary the starting point of the resistive block whose resistance will be lowered by selection of the resistive paths 208. For example, the five selectable base resistors may be configured to provide a base resistance ranging from 100 ohms to 1000 ohms. Thus, there are a plurality of approaches that may be employed for selecting a base resistive value which is subsequently adjusted by the selective coupling of the paths 208.

The above-described operation may be used in conjunction with other applications as well. For example, FIG. 7 is a functional block diagram of a current source with a parallel resistive circuit for providing a precise current source according to one embodiment of the invention. More specifically, a precise current source module shown generally at 250 includes a current mirror 254 that generates a constant current in a circuit path 258 for load 262. The constant current in circuit path 258 mirrors, or is equal to, a current of a circuit path 266. The current in circuit path 266 is based upon a precise resistive value of parallel resistive circuit 178 in relation to current drawn through resistive circuit 178 by current source 270. Accordingly, the current of path 266 may be defined precisely which results in an equivalent and precisely defined current being produced for load 262 on path 258. Generally, many different configurations may be formed that are equivalent structurally and functionally with current source 250 wherein a parallel resistive circuit 178 with very precise resolution is used to determine an output current level in a precise manner. The operation of parallel resistive circuit 178 is as described previously.

FIG. 8 is a functional block diagram of a voltage source with a parallel resistive circuit for providing a precise output voltage according to one embodiment of the invention. More specifically, a precise output voltage source shown generally at 280 includes a parallel resistive circuit 178 operably disposed between a supply voltage and circuit common and in series with a current source 270. An output voltage Vout is generated from a voltage across current source 270 at an output node coupled electrically between the constant current source 270 and the high resolution resistive circuit 178. Precise resistive variations in parallel resistive circuit 178 changes the relative voltage drop between parallel resistive circuit 178 and current source 270. Because current source 270 sources (or sinks) a constant current, the voltage across the output node for producing an output voltage level is based upon the difference between the supply voltage level and a voltage drop across the parallel resistive circuit 178. The voltage drop across parallel resistive circuit 178 is therefore based upon amount of constant current conducted through the high resolution resistive circuit. Thus, precise adjustments to the resistive value of parallel resistive circuit 178 in a manner described before defines the voltage output since Vout=Vsupply−(I*R) wherein I is constant (as generated by current source 270) and R is the resistive value of resistive circuit 178. The embodiment of FIG. 8 functionally illustrates one of many ways an output voltage may be precisely determined with a precise parallel resistive circuit 178 formed according to one embodiment of the present invention.

Figure 9:
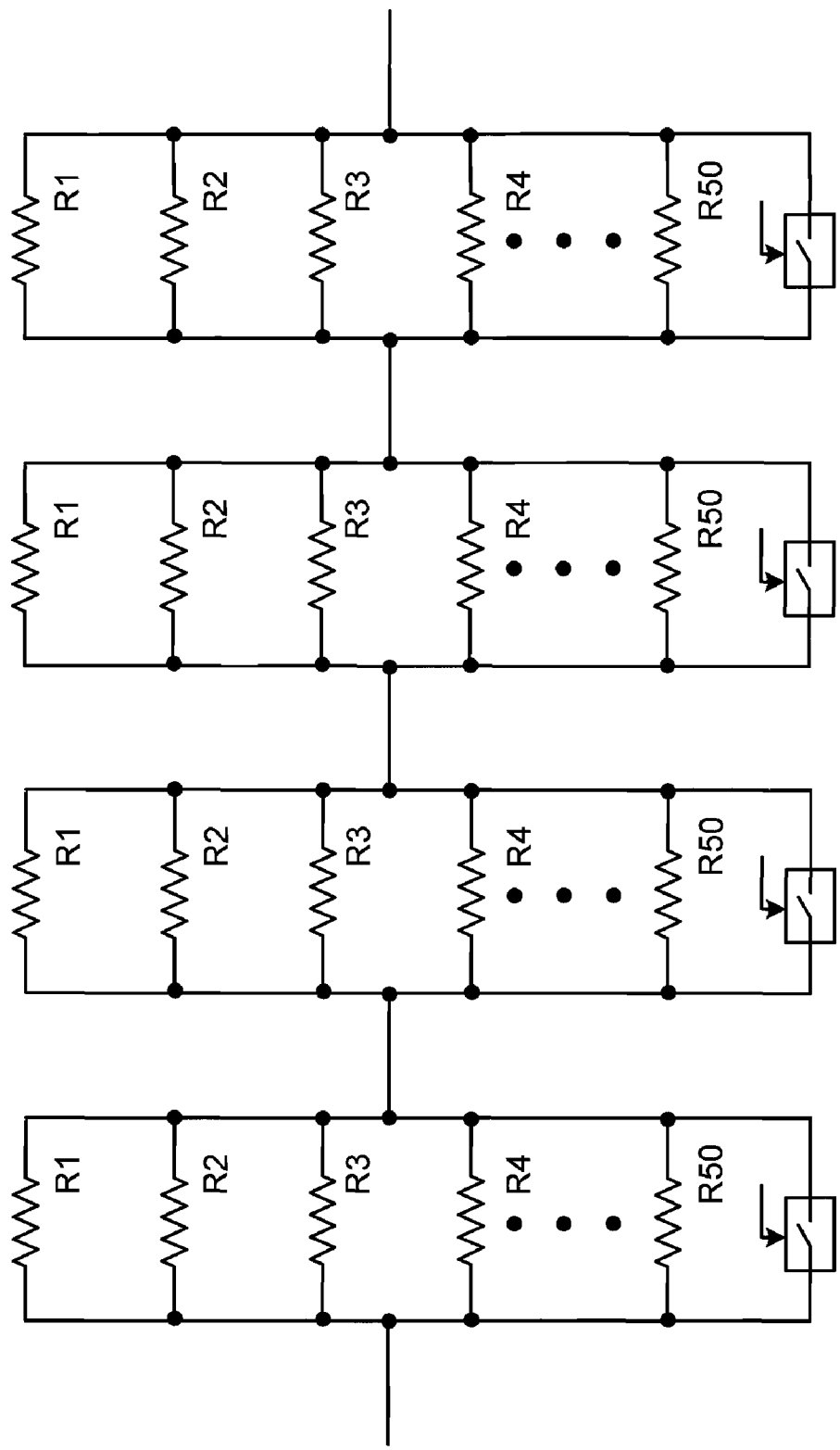
FIG. 9 illustrates an alternate approach for providing high resolution resistive values in an integrated circuit transceiver with a precise resistive module.

FIG. 9 illustrates an alternate module configuration for providing high resolution resistive values. In contrast with the embodiment of FIG. 6 which comprises a plurality of series coupled resistive elements in parallel paths, the circuit of FIG. 9 includes a plurality resistive blocks each having a plurality of parallel coupled resistive elements further coupled in parallel to a shorting switch. To provide the resolution of FIG. 6, however, the configuration requires each block to include a substantially greater number of resistive elements. In the example of FIG. 9, each block includes 50 resistive elements. To provide the range and resolution of FIG. 6, however, one circuit includes 8 blocks with 50 resistive elements wherein each resistive element has a value of approximately 2 kohms and a base resistive value of 550 ohms.

Figure 10:
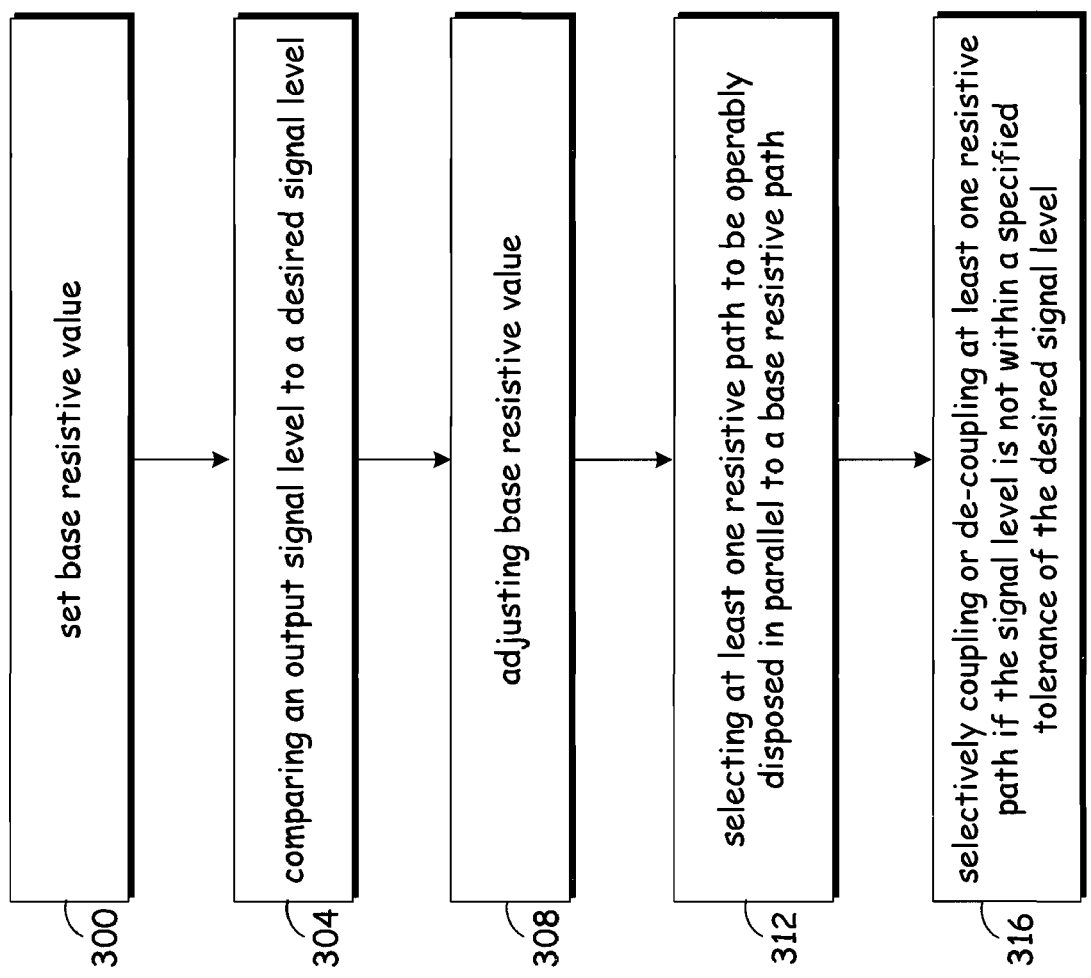
FIG. 10 is a flow chart illustrating operation according to one embodiment of the present invention for precisely adjusting a circuit's operation in a hardware efficient manner.

FIG. 10 is a flow chart illustrating operation according to one embodiment of the present invention for precisely adjusting a circuit's operation in a hardware efficient manner. Generally, the method includes varying resistive values of a parallel resistor module within a variety of applications including an active filter with a precise bandwidth and center frequency, a precise current source and a precise voltage source. More specifically, the invention initially includes setting a base resistance value for any embodiment having adjustable base resistive elements (step 300). Such adjustable base resistive elements may comprise adjustable resistor configured MOSFETs or specifically selected resistive elements to be operably disposed as a base resistive device. In an embodiment comprising a resistor configured MOSFET, the base resistive level may operably be set or adjusted by adjusting a bias level of the MOSFET. In an embodiment having selectable resistive elements for use as a base resistive element, the method includes generating control signals to operably couple the selective resistive elements to provide the desired base resistive element resistance value. Subsequent to the base resistive value being set, the method includes comparing an output signal level to a desired signal level (step 304). The comparing step may be performed at any time after a resistive value of the resistive circuit is modified and thus reflects the iterative nature of the method for determining a final configuration that provides the desired operation. Thus, while shown only once here in FIG. 8, it should be understood that step 304 may be performed even dozens of times if necessary in obtaining the precise desired circuit operation.

Based upon the comparing step, therefore, the method optionally includes adjusting the base resistive value (step 308). The method also includes selecting at least one resistive path to be operably disposed in parallel to the base resistive path (step 312). Step 312 is performed as necessary to provide a signal having a characteristic within a defined tolerance. After one or more adjustments to the total resistive value are made by selecting at least one resistive path to be operably coupled, the method includes selectively coupling or de-coupling at least one resistive path if the signal level is not within a specified tolerance of the desired signal level (step 316). Implicitly, the method includes determining what resistive paths should be operatively coupled or decoupled to generate the signal within the desired tolerance.

Figure 11:
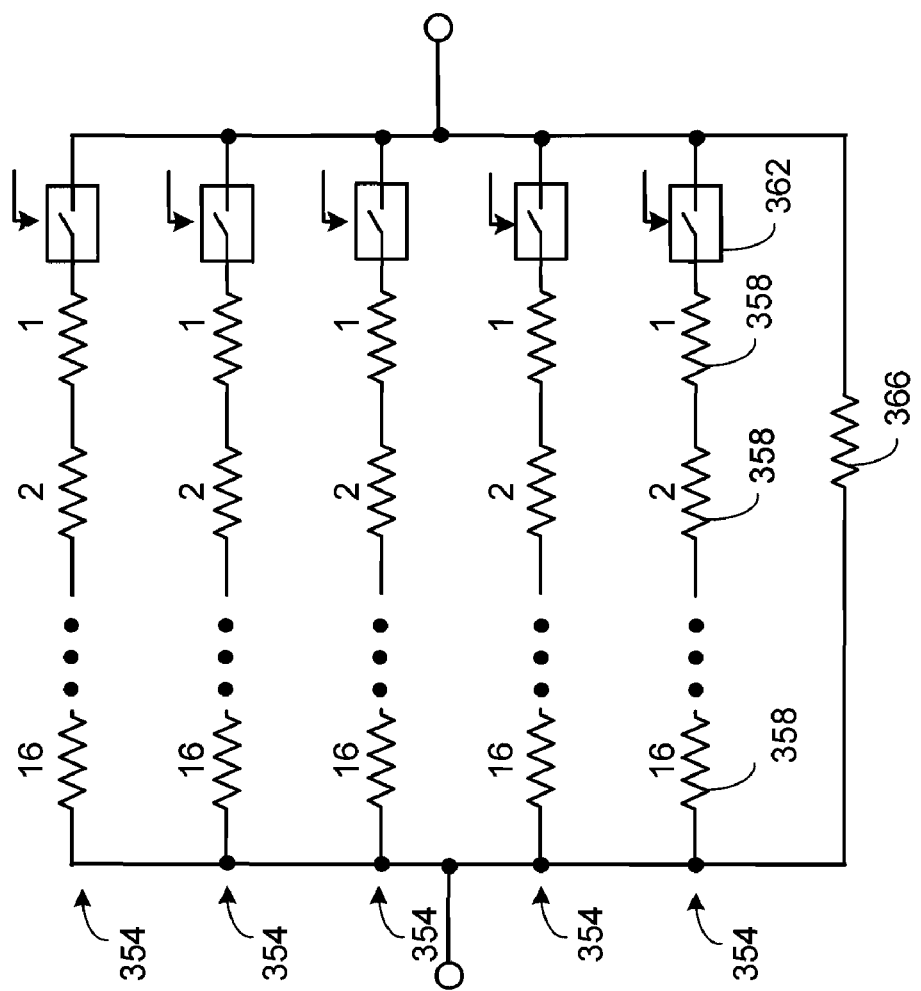
FIG. 11 is a schematic of a parallel resistive module according to one embodiment of the invention.

FIG. 11 is a schematic diagram of a parallel resistive module according to one embodiment of the invention that provides extremely precise resistive variations for extremely precise signal operations. Parallel resistive module 350 includes a plurality of rows 354 of resistive elements 358 wherein each row 354 has at least 8 series coupled resistive elements 358. In one embodiment, each row 354 has sixteen resistive elements 354 coupled in series with each other and with a selectable switch 362. A base resistive element 366 is coupled in parallel to the rows 354 of resistive elements. Parallel resistive module 350 may be used in any system requiring precise signal response as illustrated in each embodiment of the present specification.

In one embodiment, as with an embodiment illustrated in FIG. 6, each resistive element 358 is formed in a common region of an integrated circuit to have very similar values and similar process variations and is further formed to have a value of 2 kohms. Base resistive element 366 has a resistive value of approximate 600 ohms. As such, the resolution provided is approximately 10 ohms. Using formula (1) defined in relation to FIG. 6, the calculated total resistance value for one selected branch is 588.75. Two, three, four and five selected branches give resistive values of 578.31, 568.04, 558.14 and 548.57, respectively. For greater resolution, more resistive elements may be added to each branch and/or higher resistive values may be used for the resistive elements in each branch.

For example, if five branches are provided that each have 40 resistive elements each having a resistive value of 2000 ohms (+/−10%), the step size for each added branch is less than 5 ohms. Alternatively, if each resistive element has a value of 5000 ohms, only 16 resistive elements are required to provide a resolution step size of 5 ohms or less. Additionally, for each embodiment, the number of parallel branches thus increases the range. Thus, a trade off exists between resolution, range and number of components. If a range of 50 ohms is required with a resolution of about 10 ohms, the embodiment of FIG. 11 with resistive values of 2000 ohms for each resistive element 358 may be used. If however, the required resolution is 5 ohms for a range of 50 ohms, then as many as twelve branches having 16 resistive elements of 5000 ohms each may be required as determined by formula (1) depending upon the variation in resistive values due to process tolerances.

This requirement of resolution and range (5 ohms resolution over 50 ohm range) thus approximately requires 16*12+1=193 resistive elements if 5000 ohms resistive elements are used. If 2000 ohm resistive elements are used, 40*12+1 resistive elements are required. To achieve substantially similar resolution with the approach of FIG. 9, on the other hand, using 2000 ohm resistive elements, 400 resistive elements are required for each resistive step. Thus, 400*10=4000 resistive elements are required to provide 5 ohm steps over a range of 50 ohms.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled".

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

The invention claimed is:

1. An integrated circuit radio transceiver, comprising:
 a baseband processor for generating outgoing digital signals and for receiving and processing ingoing digital signals;
 front-end circuitry for producing outgoing RF based upon the outgoing digital signals and for producing the ingoing digital signals based upon received ingoing RF; and
 active filtration circuitry operably disposed to provide filtration of continuous waveform signals within the front-end circuitry, the filtration circuitry including:
  an amplification device that includes an input and an output;
  a capacitive device coupled across the input and the output; and
  a high resolution resistive circuit coupled to the input of the amplification device and to the capacitive device wherein the active filtration circuitry is operable to selectively provide very high resolution changes to operation of the filtration circuitry wherein the resistive circuit comprises a plurality of selectable parallel paths each having a plurality of series coupled resistive elements.

2. The integrated circuit radio transceiver of claim 1 wherein the plurality of selectable paths include resistive elements formed within a proximate region of the integrated circuit with similar process variations.

3. The integrated circuit radio transceiver of claim 1 wherein the series coupled resistive elements are all formed to have the same value.

4. The integrated circuit radio transceiver of claim 1 further including a base resistive element disposed in parallel to the plurality of selectable parallel paths.

5. The integrated circuit radio transceiver of claim 4 wherein the series coupled resistive elements are all formed to have a specified value and further wherein the base resistive element is characterized by a resistive value substantially less than the specified value of the series coupled resistive elements.

6. The integrated circuit radio transceiver of claim 5 wherein the resistive value of the base resistive element is less than one half of the resistive value of any one resistive element of each of the plurality of selectable parallel paths.

7. The integrated circuit radio transceiver of claim 5 wherein the base resistive element comprises a resistor configured MOSFET.

8. The integrated circuit radio transceiver of claim 7 further including logic operable to set and adjust a resistive value of the base resistive device.

9. The integrated circuit radio transceiver of claim 1 further including logic for iteratively selecting the selectable parallel paths to adjust the total resistance of the high resolution resistive circuit by a value that is approximately equal to or less than two percent.

10. An integrated circuit radio transceiver, comprising:
a baseband processor for generating outgoing digital signals and for receiving and processing ingoing digital signals;
front-end circuitry for producing outgoing RF based upon the outgoing digital signals and for producing the ingoing digital signals based upon received ingoing RF; and
a current source operably disposed to provide a current signal within the front-end circuitry, the current source including:
a first transistor that includes an input and an output for a current path; and
a high resolution resistive circuit operably disposed to conduct current of the current path, wherein an amount of current conducted is based upon a resistive value of the high resolution resistive circuit, and further wherein the resistive circuit is operable to selectively provide very high resolution changes to output current levels of the current source wherein the resistive circuit comprises a plurality of selectable parallel paths each having a plurality of series coupled resistive elements.

11. The integrated circuit radio transceiver of claim 10 wherein the plurality of selectable paths include resistive elements formed within a proximate region of the integrated circuit with similar process variations.

12. The integrated circuit radio transceiver of claim 10 wherein the series coupled resistive elements are all formed to have a specified value.

13. The integrated circuit radio transceiver of claim 12 further including a base resistive element disposed in parallel to the plurality of selectable parallel paths.

14. The integrated circuit radio transceiver of claim 13 wherein the series coupled resistive elements are all formed to have a specified value and further wherein the base resistive element is characterized by a resistive value substantially less than the specified value of the series coupled resistive elements.

15. The integrated circuit radio transceiver of claim 13 wherein the resistive value of the base resistive element is less than one half of the resistive value of any one resistive element of each of the plurality of selectable parallel paths.

16. The integrated circuit radio transceiver of claim 13 wherein the base resistive element comprises a resistor configured MOSFET.

17. The integrated circuit radio transceiver of claim 16 further including logic operable to set and adjust a resistive value of the base resistive device.

18. The integrated circuit radio transceiver of claim 10 further including logic for iteratively selecting the plurality of selectable parallel paths to adjust the total resistance of the high resolution resistive circuit by a value that is approximately equal to or less than two percent.

19. The integrated circuit radio transceiver of claim 10 wherein the current source further includes a current mirror that generates a mirrored current based upon a current level within the current path wherein the mirrored current remain substantially constant as long as the current in the current path remain constant.

20. An integrated circuit radio transceiver, comprising:
a baseband processor for generating outgoing digital signals and for receiving and processing ingoing digital signals;
front-end circuitry for producing outgoing RF based upon the outgoing digital signals and for producing the ingoing digital signals based upon received ingoing RF; and
a voltage source operably disposed to provide a current signal within the front-end circuitry, the voltage source including:
a constant current source;
a high resolution resistive circuit operably disposed to conduct constant current produced by the constant current source; and
an output node coupled electrically between the constant current source and the high resolution resistive circuit, the output node for producing an output voltage level wherein the output voltage level is based upon the an amount of constant current conducted through the high resolution resistive circuit, and further wherein the resistive circuit is operable to selectively provide very high resolution changes to output voltage levels wherein the resistive circuit comprises a plurality of selectable parallel paths each having a plurality of series coupled resistive elements.

21. The integrated circuit radio transceiver of claim 20 wherein the plurality of selectable paths include resistive elements formed within a proximate region of the integrated circuit with similar process variations.

22. The integrated circuit radio transceiver of claim 20 wherein the series coupled resistive elements are all formed to have a specified value.

23. The integrated circuit radio transceiver of claim 20 further including a base resistive element disposed in parallel to the selectable parallel paths.

24. The integrated circuit radio transceiver of claim 23 wherein the series coupled resistive elements are all formed to have a specified value and further wherein the base resistive element is characterized by a resistive value substantially less than the specified value of the series coupled resistive elements.

25. The integrated circuit radio transceiver of claim 24 wherein the resistive value of the base resistive element is less than one half of the resistive value of any one resistive element of each of the plurality of selectable parallel paths.

26. The integrated circuit radio transceiver of claim 23 wherein the base resistive element comprises a resistor configured MOSFET.

27. The integrated circuit radio transceiver of claim 24 further including logic operable to set and adjust a resistive value of the base resistive device.

28. The integrated circuit radio transceiver of claim 24 further including logic for iteratively selecting the selectable parallel paths to adjust the total resistance of the high resolution resistive circuit by a value that is approximately equal to or less than two percent.

29. A method for setting a signal level based upon a resistive setting, comprising:
selecting and coupling at least one resistive path of a plurality of selectable very high resolution resistive paths of a very high resolution resistive block to be operably disposed in parallel to a base resistive path;
comparing a corresponding signal level to a desired signal level; and selectively coupling at least one very high resolution resistive path or de-coupling at least one very high resolution resistive path of the plurality of selectable very high resolution resistive paths of the very high resolution resistive block if the corresponding signal level is not within a specified tolerance of the desired signal level.

30. The method of claim 29 further including setting a variable resistive value of a base resistive device by selecting at least one of a plurality of selectable base resistive devices.

31. The method of claim 30 further including setting a variable resistive value of a base resistive device wherein the base resistive device is a resistor-configured MOSFET and wherein the resistive value is adjusted by changing a bias level of the resistor configured MOSFET.

* * * * *

UNITED STATES PATENT AND TRADEMARK OFFICE
CERTIFICATE OF CORRECTION

PATENT NO. : 7,742,752 B2  
APPLICATION NO. : 11/686933  
DATED : June 22, 2010  
INVENTOR(S) : Seema B. Anand Page 1 of 1

It is certified that error appears in the above-identified patent and that said Letters Patent is hereby corrected as shown below:

Col. 16, Claim 20, line 22, - after "the" delete "an amount of"

Signed and Sealed this
Twentieth Day of March, 2012

David J. Kappos
*Director of the United States Patent and Trademark Office*